No. 12,442. REISSUED JAN. 30, 1906.

G. H. VILLY.

HORN FOR PHONOGRAPHS, EAR TRUMPETS, &c.

APPLICATION FILED OCT. 26, 1905.

3 SHEETS—SHEET 1.

Witnesses
C. H. Andrews
J. B. Paddett

Inventor
Gustave Harman Villy
By His Attorney
C. H. Ettickney

No. 12,442. REISSUED JAN. 30, 1906.
G. H. VILLY.
HORN FOR PHONOGRAPHS, EAR TRUMPETS, &c.
APPLICATION FILED OCT. 26, 1905.
3 SHEETS—SHEET 2
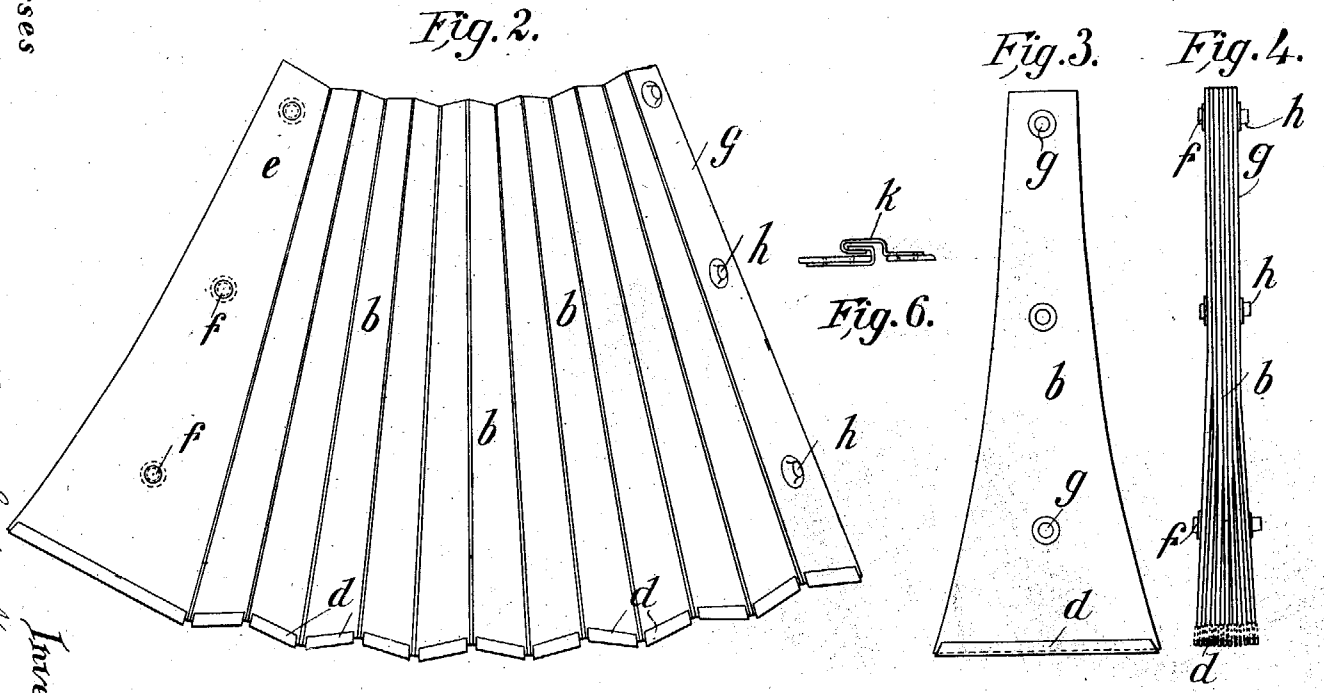
Witnesses
C. H. Andrews
J. Faddett
Inventor
Gustave Herman Villy
By His Attorney
R. E. Hickney No. 12,442. REISSUED JAN. 30, 1906.

G. H. VILLY.

HORN FOR PHONOGRAPHS, EAR TRUMPETS, &c.

APPLICATION FILED OCT. 26, 1905.

3 SHEETS—SHEET 3.

Witnesses
C. H. Andrews
J. Baddett

Inventor
By His Gustave Harman Villy
Attorney B. C. Stickney

UNITED STATES PATENT OFFICE.

GUSTAVE HARMAN VILLY, OF MANCHESTER, ENGLAND, ASSIGNOR TO UNITED STATES HORN COMPANY, OF NEW YORK, N. Y., A CORPORATION.

HORN FOR PHONOGRAPHS, EAR-TRUMPETS, &c.

No. 12,442. Specification of Reissued Letters Patent. Reissued Jan. 30, 1906.

Original No. 739,954, dated September 29, 1903. Application for reissue filed October 26, 1905. Serial No. 284,581.

*To all whom to may concern:*

Be it known that I, GUSTAVE HARMAN VILLY, a subject of the King of Great Britain and Ireland, residing at 5 Longford Place, Longsight, Manchester, in the county of Lancaster, England, have invented certain new and useful Improvements in Connection with Horns for Phonographs, Ear Instruments, and for Like Purposes, (for which I have made application for Letters Patent in Great Britain, No. 20,146, and dated 15th day of September, 1902,) of which the following is a specification.

This invention relates to improvements in connection with horns or trumpet-like sound distributers or collectors for use upon phonographs, gramophones, and other like instruments, and also for ear-trumpets, fog-horns, and other sound distributing and collecting devices, the object being to provide a horn or trumpet-like device which can be folded when not in use, so as to be capable of ready transportation and for placing within the case of the phonograph or in the pocket of the user when it is to be applied to an ear instrument or the like.

The accompanying drawings represent one form of the invention.

Figure 1:
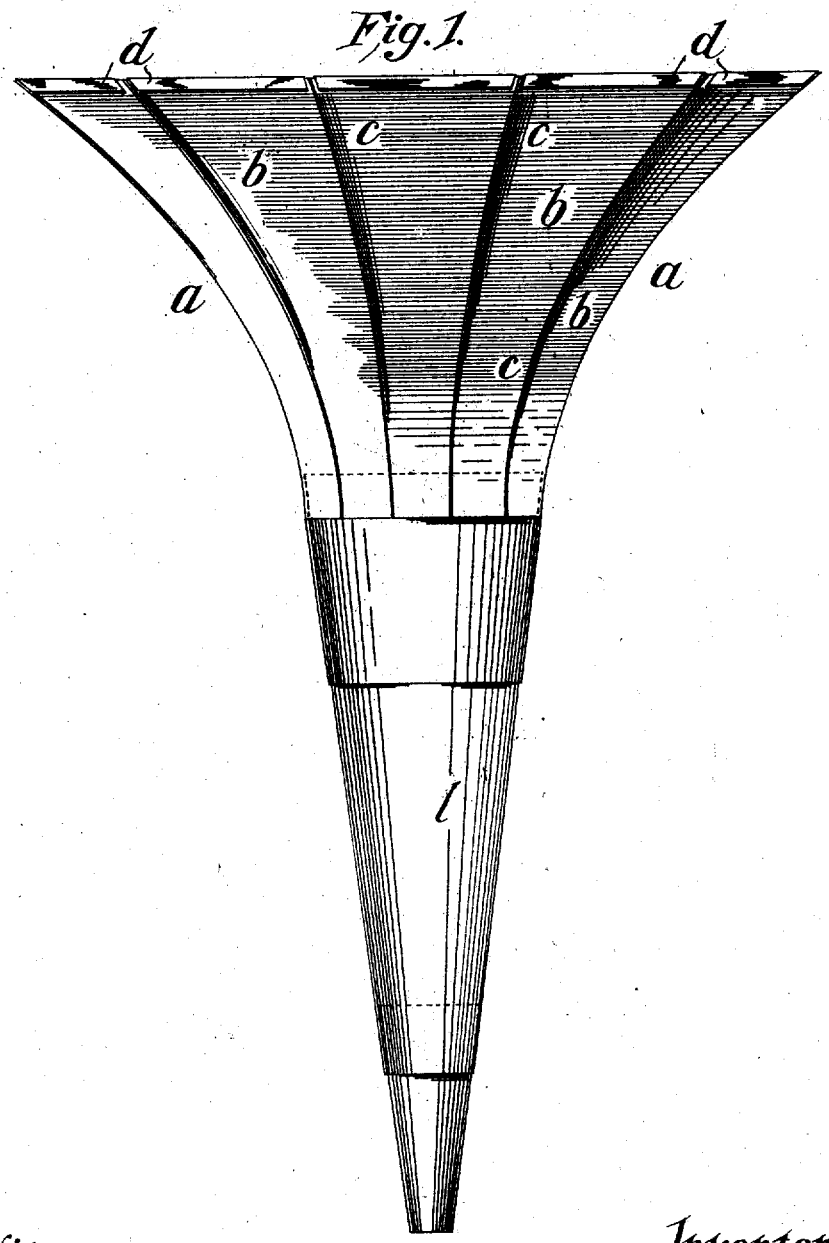
Figure 5:
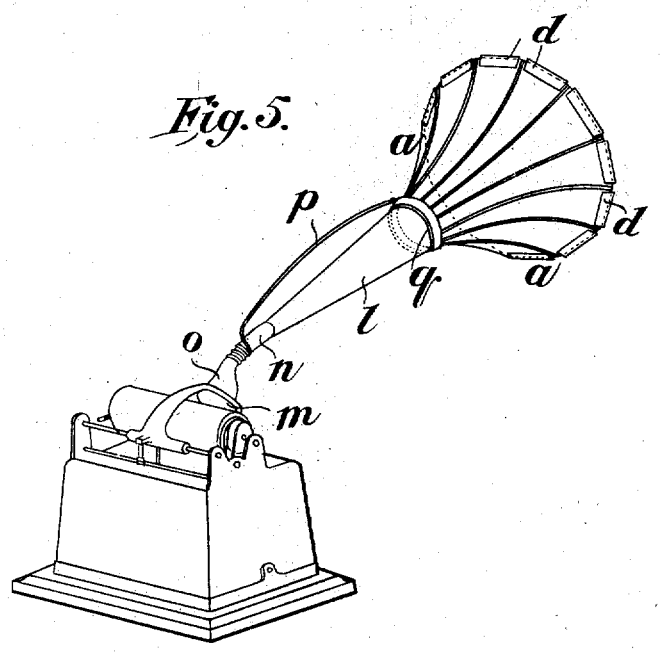

Figure 1 is an elevation of the complete or erected horn. Figs. 2, 3, and 4 are detail views illustrating the manner in which the horn can be collapsed or folded. Fig. 5 is a perspective view illustrating one convenient application of the improved horn to a phonograph. Fig. 6 is a detail view on an enlarged scale.

In carrying my invention into effect in one convenient manner when making my folding horn for use, particularly in connection with a phonograph or like instrument, I make the end *a* of trumpet-like or curved configuration with an enlarged outer end and a smaller end at the interior of the conoidal-like form. I make this enlarged and trumpet-like device by employing a series of strips *b* of paper, wood, linen, or other preferably flexible material, the foundations of which I prefer to make of linen or the like, so as to form a hinge-like connection *c* between each of the strips, the members *b* of which I arrange so that while lying close together when extended there is a dividing-line between them, about which they can be folded upon the base of linen or the like connecting-web, upon which the paper or other material is mounted. The longitudinal hinged edges *c* of the flexible segments or sectors *b* are curved in such manner that although the segments when opened out cannot lie in the same plane they can either be folded together in a zigzag manner, so as to lie parallel to one another, as shown in Figs. 2 to 4, or extended by springing or buckling into the requisite trumpet or bell-like form, as shown in Figs. 1 and 5. The angles formed by the meeting of the hinged segments when extended form, as it were, ribs, giving rigidity to the trumpet form. The outer ends of the segmental-like strips I prefer to protect by a bent or turned-over edging *d* of metal, making the connection rigid by pressing a portion of the strip of metal or other binding material into the edge of the paper or the like foundation.

Upon the extreme member *e* of the series of strips *b* thus formed into one band I provide eyelets *f* or other clip-like devices for enabling snap projections *h* on the opposite end strip *g* to be engaged therewith and when thus engaged to form a completed trumpet-like sound-distributer.

Instead of arranging eyelets or hook-like clips upon the outer members of the series of strips I may make one to engage with the other by forming a bead-like connection or flange *k* upon one member, into which the corresponding projecting or engaging portions of the other may enter, as shown in Fig. 6. When providing for an extension and a long funnel-like carrier for the built-up trumpet-like end *a* to engage with, I sometimes make a conical tube *l*, the enlarged end of which engages with the inner end of the trumpet-terminal *a*, while the smaller end of the cone engages with the receiver *m* of the phonograph or enters into the rubber or other tubular or flexible connection which may be employed for use upon any particular instrument. I prefer to make this extended or carrying member *l* for the collapsible trumpet from paper or other suitable material built up in a similar manner to that hereinbefore described to my collapsible end, or the cone may be made in a short length in one piece or it may be made telescopic when so desired.

When providing for a flexible connection at the extreme end of the cone *l*, I attach length of rubber or the like tubing *n*, which I bind with metal or other band at the end for the purpose of inserting it upon the funnel *o* of the phonograph-reproducer, and I stiffen the combination trumpet and funnel with flexible end by providing one or more bars *p* of metal or the like stiffeners which support the funnel by means of elastic or other connections *q*, arranged upon the cone end and suspended from the projecting stiffening hook or members *p*, carried from the metal end or binder of the flexible tube *n*.

When constructing a funnel or tube for an ear-trumpet or for a fog or speaking horn or the like, I employ the same method of building up the segments to form the expanding surface, modifying the arrangement of the inner end to suit the connection that is to be made therewith, so that when the trumpet is in use it can be extended and a large outer area exposed for the collection of sound and when not in use it can be folded each segment upon the other, so as to occupy but little space—that is to say, a trumpet such as illustrated in Figs. 1 to 4 would be suitable as an ear-trumpet.

I am aware that it has hitherto been proposed to form conical or pyramidal horns from cardboard provided with a linen foundation; but such horns have been made up from a single flat scored sheet or from a number of flat triangular strips having straight edges. Such horns could be developed or laid out upon a flat surface. Owing to their formation, if such horns were made collapsible they would have to be sustained in their conical form by additional sustaining means, or if they were made self-sustaining they could not be made collapsible. In contradistinction to this my collapsible horn could not be made up from a single flat sheet, as each strip has to be made with curved edges, and when the strips are flexibly secured together at such curved edges the whole or complete surface so formed cannot be laid out or developed on a flat surface. My horn, owing to the curvature of the edges of the strips, is self-sustaining and requires no additional stiffening or sustaining devices, although when it is desired to collapse the horn this may be effected by forcibly straightening and folding the strips one against the other in the manner hereinbefore described with reference to Figs. 2, 3, and 4. The horn when erected offers a decided resistance to such straightening or folding sufficient to render it self-sustaining against all ordinary shocks liable to be encountered; but it is found that when one strip has been forcibly straightened or folded against another the equilibrium of the trumpet is destroyed and the whole may be easily collapsed.

I do not limit the application of my invention to any particular method of building up the segments or to any special curve or configuration of the same, and I vary the method of jointing and stiffening them to suit the material from which the strips are constructed and the foundation or base fabric upon which the flexible material forming the strips is secured.

Having thus described my invention, what I claim as new, and desire to secure by Letters Patent, is—

1. A collapsible but self-sustained phonograph-horn, ear-trumpet or the like comprised of a number of flexible strips having curved meeting edges substantially as set forth.

2. A collapsible but self-sustained phonograph-horn, ear-trumpet or the like comprising a number of flexible strips having curved meeting edges and mounted on a flexible foundation, substantially as and for the purposes hereinbefore set forth.

3. A collapsible but self-sustained phonograph-horn, ear-trumpet or the like comprising a number of flexible strips having curved meeting edges, a flexible foundation for said strips and means for detachably securing the two extreme strips together, substantially as set forth.

4. A collapsible but self-sustained phonograph-horn, ear-trumpet or the like comprising a number of flexible strips having curved meeting edges, flexible connections between such edges and protecting means on the outer exposed edges, substantially as set forth.

5. A phonograph-horn, ear-trumpet or the like comprising a rigid conical tube and a collapsible trumpet-shaped mouth, the latter being made up of a number of flexible strips having curved meeting edges, and flexible connections at such edges, substantially as hereinbefore set forth.

6. A horn of the class described comprising a rigid conical tube, and a collapsible trumpet-shaped mouth made up of a number of flexible strips having curved meeting edges, said mouth being connected to said rigid conical tube, substantially as described.

7. A horn of the class described comprising a rigid conical tube, and a collapsible trumpet-shaped mouth made up of a number of flexible strips having curved meeting edges, said mouth being telescopically connected to said conical tube, substantially as described.

8. A phonograph-horn or the like comprising a number of flexed strips having curved meeting edges, and means joining said edges, said strips being so flexed and said edges so curved and joined that the horn is given a trumpet-like or bell-like form, the strips forming angles where said edges meet.

9. A phonograph-horn or the like comprising a number of strips each having a foundation or facing of linen or the like, said strips being so flexed and their edges so curved and joined that the horn is given a trumpet-like or bell-like form, the strips forming angles where said edges join or meet.

10. A phonograph-horn comprising a number of strips joined or meeting at their edges, said strips being so flexed and said edges so curved that the horn is given a trumpet-like or bell-like form, the strips forming angles where said edges join, and protecting means on the outer exposed edges or ends of the strips.

11. A horn comprising a funnel-like portion and a trumpet-shaped mouth portion, the latter comprising a number of strips provided with means joining them at their edges, said strips being flexed and said edges curved so as to produce the trumpet form of said mouth portion, and said strips having angular relation to one another, substantially as described.

12. A phonograph-horn comprising a number of flexed strips having curved meeting edges, means joining said strips edge to edge, said strips being so flexed and said edges so curved and joined that the horn is given a trumpet-like or bell-like form, the strips forming angles where said edges meet, and protecting devices applied upon the outer exposed edges or ends of the strips.

13. A phonograph-horn comprising a funnel-like portion and a mouth portion, the latter comprising a number of side portions extending lengthwise of the horn and joining one another at their borders, forming angles where joining, said sides so curved at their corner portions and so flexed as to give the mouth portion a trumpet-like or bell-like form, and their outer exposed ends being provided with protecting means.

14. A horn comprising a funnel-like portion and a trumpet-shaped mouth portion, the latter comprising a number of strips or sides provided with means joining them at their edges, said strips being flexed and said edges curved so as to produce the trumpet form of said mouth portion, and said strips having angular relation to one another, and protecting means on the outer exposed edges or ends of the strips.

GUSTAVE HARMAN VILLY.

Witnesses:

DORA VILLY,

ROBERT MORRISON NEILSON.